United States Patent [19]

Smuk

[11] Patent Number: 6,056,346
[45] Date of Patent: May 2, 2000

[54] ROLL-IN/ROLL-OUT VEHICLE SEAT SYSTEM WITH FIXED WHEEL MEMBERS

[75] Inventor: Wojciech Smuk, Troy, Mich.

[73] Assignee: Bertrand Faure Components Ltd., Mississauga, Canada

[21] Appl. No.: 08/807,703

[22] Filed: Feb. 28, 1997

Related U.S. Application Data

[60] Provisional application No. 60/014,275, Mar. 28, 1996.
[51] Int. Cl.[7] .................................................. B60N 2/04
[52] U.S. Cl. ................................ 296/65.03; 296/65.13; 248/429; 248/503.1
[58] Field of Search ........................... 296/65.03, 65.04, 296/65.13, 65.14; 248/429, 430, 503.1

[56] References Cited

U.S. PATENT DOCUMENTS

| | | | |
|---|---|---|---|
| 4,773,693 | 9/1988 | Premji et al. | 296/65.03 |
| 5,372,398 | 12/1994 | Aneiros et al. | 296/65.03 |

*Primary Examiner*—D. Glenn Dayoan
*Assistant Examiner*—Paul Chenevert
*Attorney, Agent, or Firm*—Patrick J. Hofbauer

[57] ABSTRACT

A vehicle seat system is disclosed, comprising a seat assembly having a cushioned seat structure mounted on two rigid support structures. A front and a rear connector are mounted on each rigid support structure for releasable, securing engagement with respective front and rear anchor members extending across front and rear wells in a vehicle floor, upon entry of the connectors into the wells. Front and rear wheel members are mounted upon each rigid support structure in non-retractable relation thereto, adjacent the respective front and rear connecting members so as to be in operative rolling contact with the floor surface of the vehicle when the connectors are removed from the wells. Front tracks associated one each with the front wells, each extend frontwardly and downwardly, from a respective track entry position, to accept, in guiding relation, a respective one of the front wheel members, upon forward rolling movement of the seat assembly, into the base area of the associated front well, to thereat permit each of the front connectors to releasably, securely engage the respective front anchor member. Rear entry positions associated one each with the rear wells accept, in downwardly through passing relation, a respective one of the rear wheel members, upon forward rolling movement of the seat assembly into the base area of the associated rear well, to thereat permit the rear connecting means to each releasably, securely engage the respective rear anchor member, thereby to releasably, securingly anchor the seat assembly to the vehicle.

24 Claims, 13 Drawing Sheets

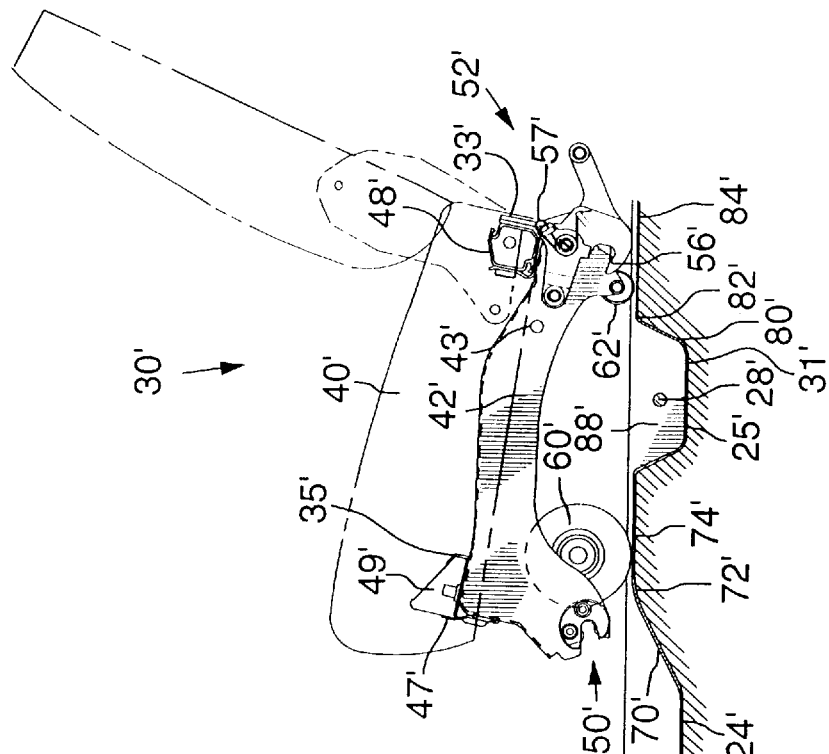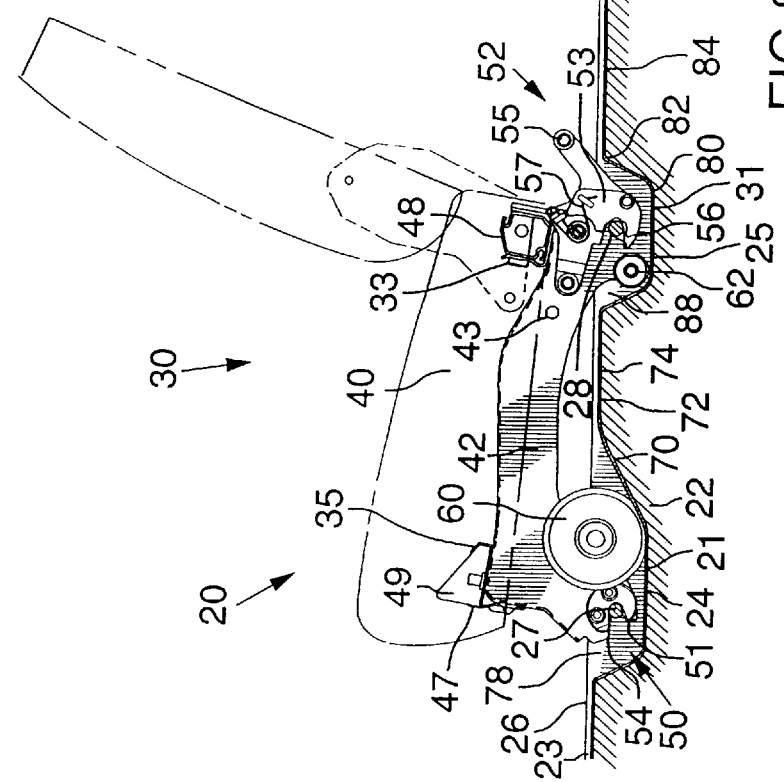
FIG.8

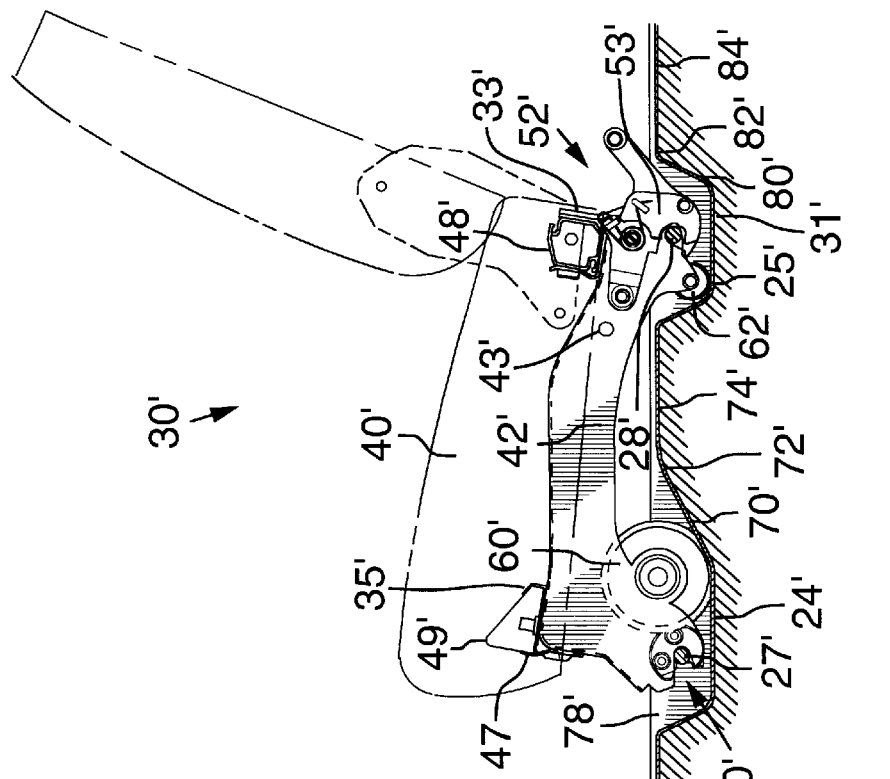
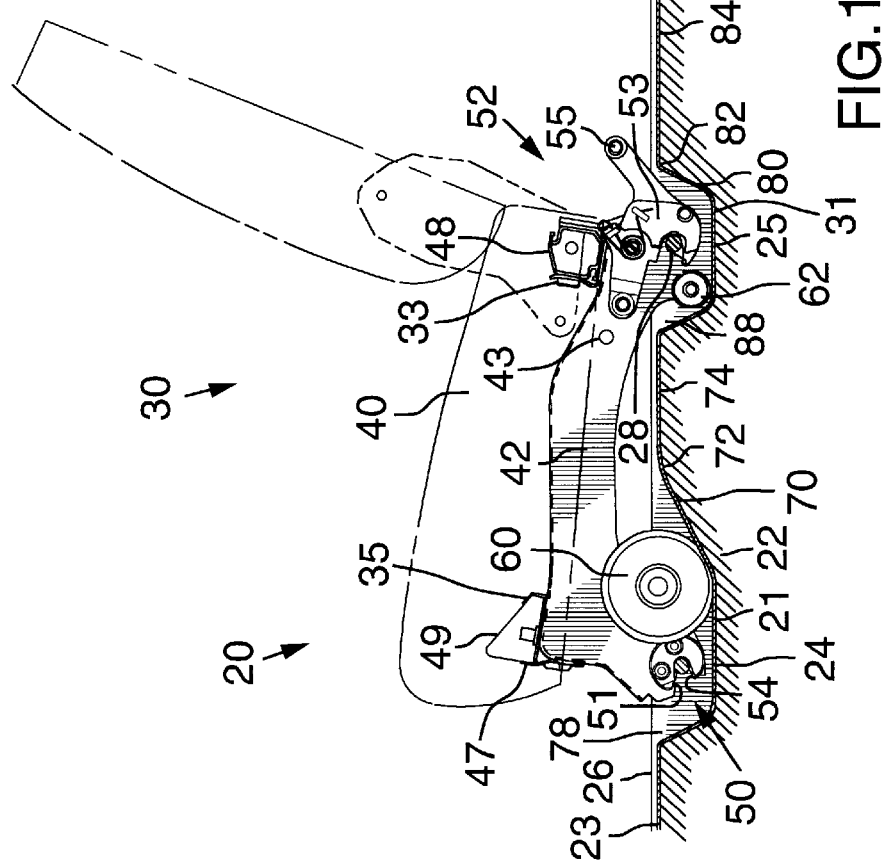
FIG.10

ROLL-IN/ROLL-OUT VEHICLE SEAT SYSTEM WITH FIXED WHEEL MEMBERS

This application claims the benefit of U.S. Provisional Patent Application No. 60/014,275, filed Mar. 28, 1996.

FIELD OF THE INVENTION

The present invention relates to removable vehicle seat systems for use in multi-seat vehicles, such as mini-vans, sport utility vehicles, and the like, and more particularly to vehicle seat systems having wheeled vehicle seat assemblies, the wheels of which are rollable into wells in the vehicle floor to thereat releasably engage anchor members so as to releasably, securingly anchor the vehicle seat assembly to the vehicle floor.

BACKGROUND OF THE INVENTION

Multi-seat vehicles, such as vans, minivans, sport utility vehicles, and the like, typically have middle (second row) and rear (third row) vehicle seat assemblies that are placed rearwardly of the driver's and front passenger's (first row) vehicle seats, and are selectively removable and replaceable through a large rear door. Removal and replacement of these vehicle seat assemblies tends to be somewhat difficult and requires a considerable amount of effort on the part of the user, especially with respect to the middle vehicle seat assembly. In order to reduce the effort required to remove or replace such a vehicle seat assembly, recent vehicle seat systems have resorted to the mounting of front and rear wheel members on the laterally opposed rigid support structures associated with each vehicle seat assembly. Such wheel members make it possible to selectively roll a vehicle seat into a design position within the vehicle, at which design position connecting means on each of the rigid support structures can securely engage anchor members located in respective wells positioned in the floor of the vehicle, thus releasably securingly anchoring the vehicle seat assembly in place within the vehicle.

One prior art wheeled vehicle seat system is disclosed in U.S. Pat. No. 5,372,398, issued Dec. 13, 1994, to Aneiros et al., for a VEHICLE SEAT ASSEMBLY WITH RETRACTING LATCH/ENGAGING ROLLER SEAT-TO-FLOOR LOCK, the teachings of which patent are-incorporated herein by reference.

The vehicle seat system taught in U.S. Pat. No. 5,372,398 employs front and rear latch members rotatably mounted one on each support structure of the vehicle seat system. The front and rear latch members are operatively joined together by a connecting rod so as to be concurrently rotatable one with the other in opposite directions by manual operation by an operator of an actuating mechanism projecting rearwardly from the vehicle seat system. Each latch member includes a hook portion and a pair of axially aligned wheel members freely rotatably mounted thereon in offset relation to the hook portion.

In use, when the vehicle seat assembly of Aneiros et al. is being placed into or removed from a vehicle, the actuating mechanism is used to position the latch members such that the wheel members are in operative rolling contact with the vehicle floor, thus permitting the vehicle seat assembly to be rolled into place. Once in place, as determined by the front wheel members engaging respective locating grooves disposed forwardly of each front well, the actuating mechanism is used to rotate the latch members such that the wheel members are lifted from operative rolling contact with the vehicle floor and the hook portions are lowered, presumably into engagement with the respective striker pins, thus securing the vehicle seat assembly within the vehicle.

While wheeled prior art removable vehicle seat systems, such as Aneiros et al., may represent a significant reduction in the amount of effort required to move the vehicle seat assembly within the vehicle after the wheel members have been successfully deployed, the actual energy and manual dexterity required of a user to deploy or retract the wheel members from such deployment is not itself insignificant. Moreover, the complicated latching mechanisms of the prior art devices, including that of Aneiros et al. are themselves prone to mis-engagement during attempted latching to the vehicle, which mis-engagement is dangerous, and therefore, highly undesirable. Also, such complicated connecting mechanisms are liable to become mis-aligned, bent, or generally damaged over time, particularly when the seat assembly is removed from the vehicle, which conditions make engagement with the anchor members on the vehicle even more difficult and prone to mis-engagement during attempted latching to the vehicle. Further, complicated connecting mechanisms are expensive to manufacture, and are less robust than they might otherwise be. Such mechanisms tend also to be unnecessarily heavy, thereby adding to vehicle ineconomy, to the effort required to lift the vehicle seat assembly out of the wells, and to otherwise handle the vehicle seat assembly. Lastly, with wheeled mechanisms according to the prior art, subsequent lifting of the vehicle seat assembly from the wells must be performed without substantial mechanical aid by the person removing the vehicle seat assembly. All of this leaves room for considerable improvement in removable wheeled vehicle seat systems of the prior art.

Another inherent problem with vehicle seat systems employing wheel members that permit ready rolling of vehicle seats into place is that the middle (second row) vehicle seat must typically be installed into the vehicle before the rear (third row) vehicle seat, and must, for this reason, pass over the location of the rear vehicle seat. Accordingly, the middle vehicle seat may drop into place in the rear vehicle seat wells, unless specific accommodation is made to preclude the middle vehicle seat from falling into the rear vehicle seat wells.

SUMMARY OF THE INVENTION

It is an object of the present invention to provide a rolling vehicle seat assembly that is easy to remove from and replace into a vehicle.

It is a further object of the present invention to provide a rolling vehicle seat assembly with a simple and reliable connecting mechanism for releasable, securing engagement with the vehicle.

It is yet another object of the present invention to provide a rolling vehicle seat system wherein stationary wheel members are rotatably mounted on the vehicle seat assemblies to facilitate rolling of the vehicle seat assemblies into and out of the vehicle.

It is a further object of the present invention to provide a vehicle seat system disinclined to mis-engagement during attempted engagement of the connecting means onto respective anchor members.

It is an object of the present invention to provide a vehicle seat system wherein engagement of the connecting means to respective anchor members of the vehicle requires minimal user effort.

It is an object of the present invention to provide a vehicle seat system wherein disengagement of the connecting means from respective anchor members requires minimal effort.

It is another object of the present invention to provide a vehicle seat system wherein lifting of the vehicle seat assembly from the wells, subsequent to disengagement from respective anchor members, is aided by the vehicle seat system.

It is an object of the present invention to provide a vehicle seat system that is unlikely to become mis-aligned, bent, or generally damaged over time, particularly when the vehicle seat assemblies are removed from the vehicle.

It is an object of the present invention to provide a vehicle seat system that is simple and inexpensive to manufacture as compared to prior art vehicle seat systems having similar utility.

It is an object of the present invention to provide a vehicle seat system that is generally robust, as compared to prior art vehicle seat systems having similar utility.

It is an object of the present invention to provide a vehicle seat system that is lighter in weight than prior art rolling vehicle seat systems having similar utility.

It is an object of the present invention to provide a vehicle seat system wherein the middle (second row) vehicle seat is readily rollable into place from a rear entry door past the location of the rear (third row) vehicle seat.

These and other objects are addressed by the present invention, a vehicle seat system.

In accordance with the present invention there is disclosed a vehicle seat system for use with a vehicle, such as a mini-van, having a longitudinal axis and a floor having an upwardly facing floor surface. The floor also has a first pair of front wells and a first pair of rear wells, which front wells and rear wells extend below the floor surface and would typically be positioned behind the first row of seats in the vehicle which accommodate the driver and the front passenger. Front anchor members and rear anchor members extend across the front wells and rear wells, respectively, vertically positioned below the floor surface. The vehicle seat system comprises a first seat assembly, comprising a first cushioned seat structure and a first pair of rigid support structures disposed adjacent laterally opposite ends of the first cushioned seat structure, with the first cushioned seat structure being mounted on the first pair of rigid support structures. A front connecting means is mounted on each of the rigid support structures, each of the front connecting means being associated with and adapted for releasable, securing engagement with a respective one of the front anchor members upon entry of the front connecting means into the front wells. A rear connecting means is mounted on each of the rigid support structures, each of the rear connecting means being associated with and adapted for releasable, securing engagement with a respective one of the rear anchor members upon entry of the rear connecting means into the rear wells. A front wheel member is mounted on each of the rigid support structures in nonretractable, rotatable fixed relation thereto, each front wheel member being mounted adjacent to the respective front connecting means of the rigid support structure and being associated with a respective one of said front wells.

A rear wheel member is mounted on each rigid support structure in non-retractable, rotatable fixed relation thereto, each rear wheel member being mounted adjacent to the rear connecting means of the rigid support structure and being associated with a respective one of the rear wells. There is also provided a pair of track entry positions, comprising two track entry positions, each track entry position being positioned substantially level with the floor surface, such that each of the front wells is disposed longitudinally frontwardly from a respective one of the track entry positions. Additionally, there is provided a pair of front tracks, comprising two front tracks, each being positioned within a respective one of the front wells. The front wheel members and rear wheel members are adapted to permit longitudinal rolling movement of the first seat assembly when the first seat assembly is operatively positioned with the front wheel members upon the front tracks and with the rear wheel members upon the floor surface and when the first seat assembly is operatively positioned with the front wheel members upon the floor surface and the rear wheel members upon the floor surface, when each of the front connecting means is released from securing engagement with its associated front anchor member, and when each of the rear connecting means is released from securing engagement with its associated rear anchor member.

Each of the front tracks is associated with a respective one of the front wheel members and extends longitudinally frontwardly and downwardly from a respective one of the track entry positions to a base area, vertically positioned below said floor surface, of the front well disposed longitudinally frontwardly from said respective one of the track entry positions, each front track being adapted to guidingly accept its associated front wheel member for said longitudinal rolling movement from said respective one of the track entry positions to the base area, and to thereat permit the front anchor member of said front well to releasably, securingly engage as aforesaid with its associated front connecting means, thereby to releasably, securingly anchor the first seat assembly to the vehicle. The rear wheel members and rear connecting means further are adapted, such that, when the front wheels are operatively positioned in the base areas of the front wells, the rear wheel members and rear connecting means are positioned in the rear wells, thereby causing each rear connecting means to releasably, securely engage with its associated rear anchor member, as aforesaid, thereby to releasably, securingly anchor the first seat assembly to the vehicle. Preferably, the vehicle seat system further comprises a pair of rear entry positions, comprising two rear entry positions, each rear entry position being positioned substantially level with the floor surface, such that each of said rear wells is disposed longitudinally frontwardly from a respective one of said rear entry positions. As well, there is preferably provided a pair of rear tracks, comprising two rear tracks, each rear track being associated with a respective one of the rear wheel members and extending longitudinally frontwardly from a respective one of the rear entry positions to a base area, vertically positioned below the floor surface, of the rear well disposed longitudinally frontwardly from said respective one of the rear entry positions, with the rear wheel members further being adapted to permit longitudinal rolling movement of the first seat assembly when the first seat assembly is operatively positioned with the front wheel members upon the front tracks and the rear wheel members upon the rear tracks, when each of the front connecting means is released from securing engagement with its associated front anchor member, and when each of the rear connecting means is released from securing engagement with its associated rear anchor member. Other objects, advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described hereinbelow.

BRIEF DESCRIPTION OF THE DRAWINGS

The novel features which are believed to be characteristic of the vehicle seat system according to the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only, and are not intended as a definition of the limits of the invention. Embodiments of this invention will now be described by way of example in association with the accompanying drawings in which:

FIG. 8 is a view similar to FIG. 7, with the rear (third row) vehicle seat assembly also being installed into the vehicle;

FIG. 10 is a view similar to FIG. 9, but with the rear portions of the rigid support structures of the rear (third row) vehicle seat assembly in place in the respective second rear wells;

DETAILED DESCRIPTION OF A PREFERRED EMBODIMENT

Figure 1:
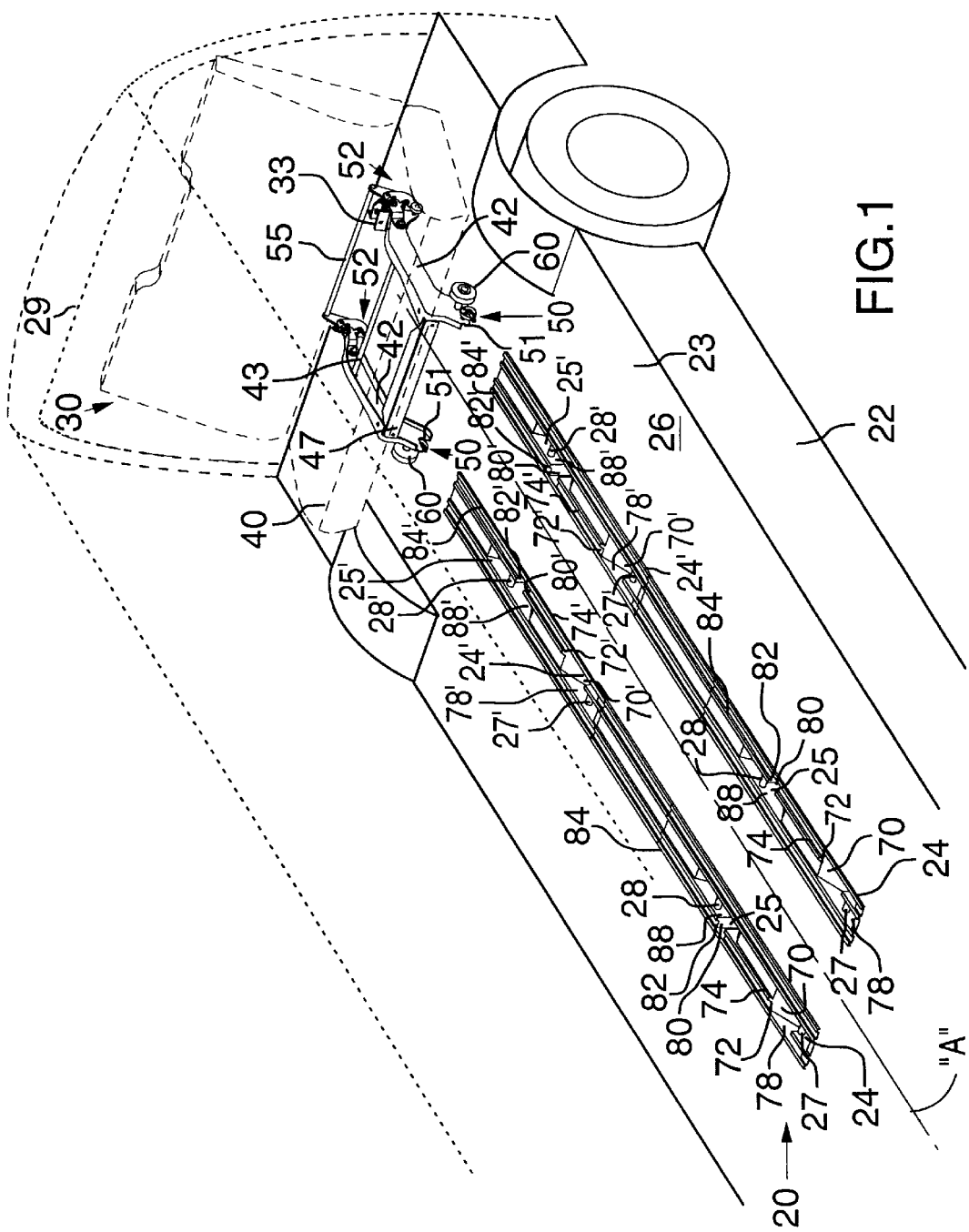
FIG. 1 is a perspective view of a preferred embodiment of the vehicle seat system according to the present invention, with the middle (second row) vehicle seat assembly being installed in a vehicle, which vehicle is partially shown in phantom outline.
Figure 2:
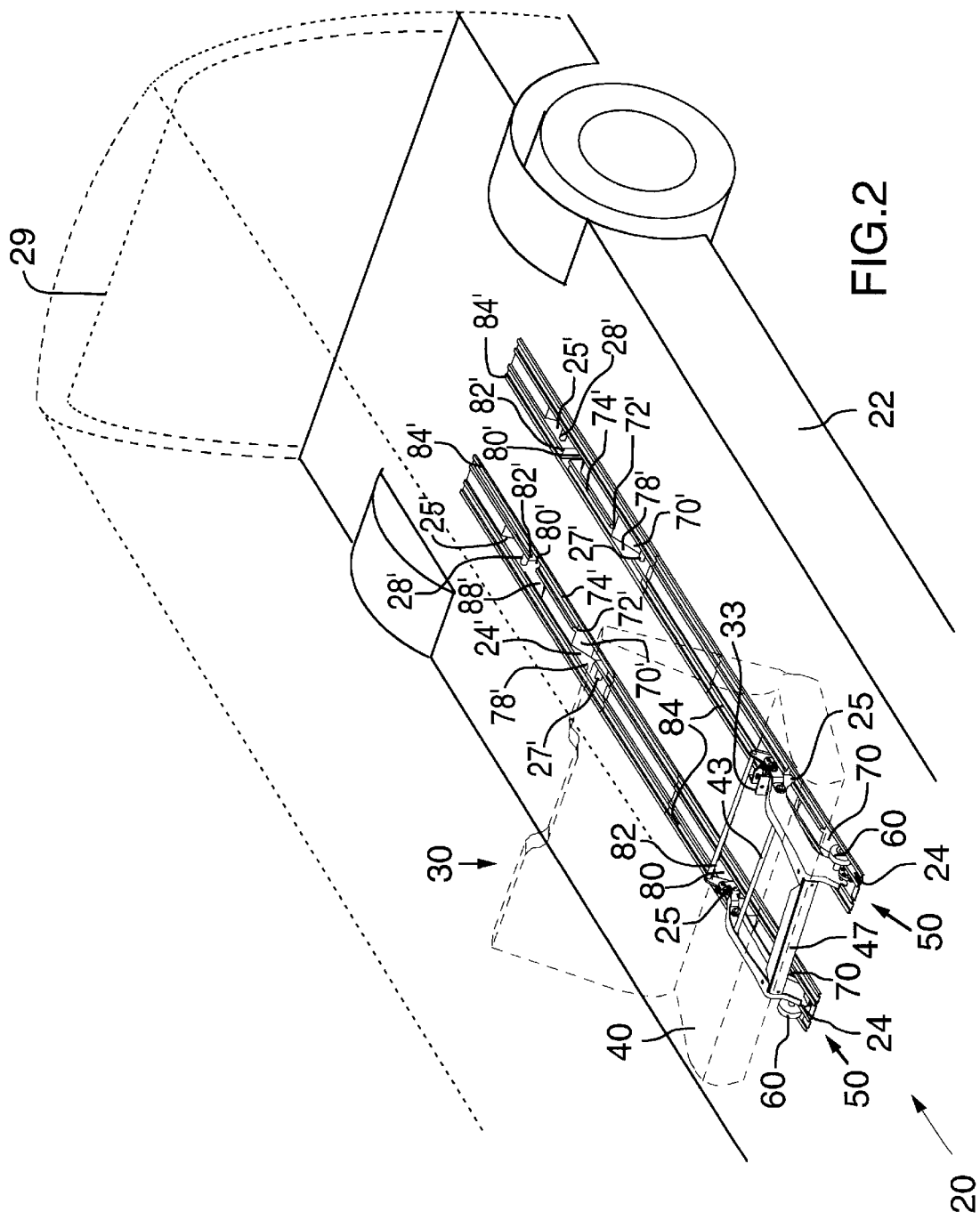
FIG. 2 is a perspective view similar to FIG. 1, with the middle (second row) vehicle seat assembly fully installed in the vehicle.
Figure 3:
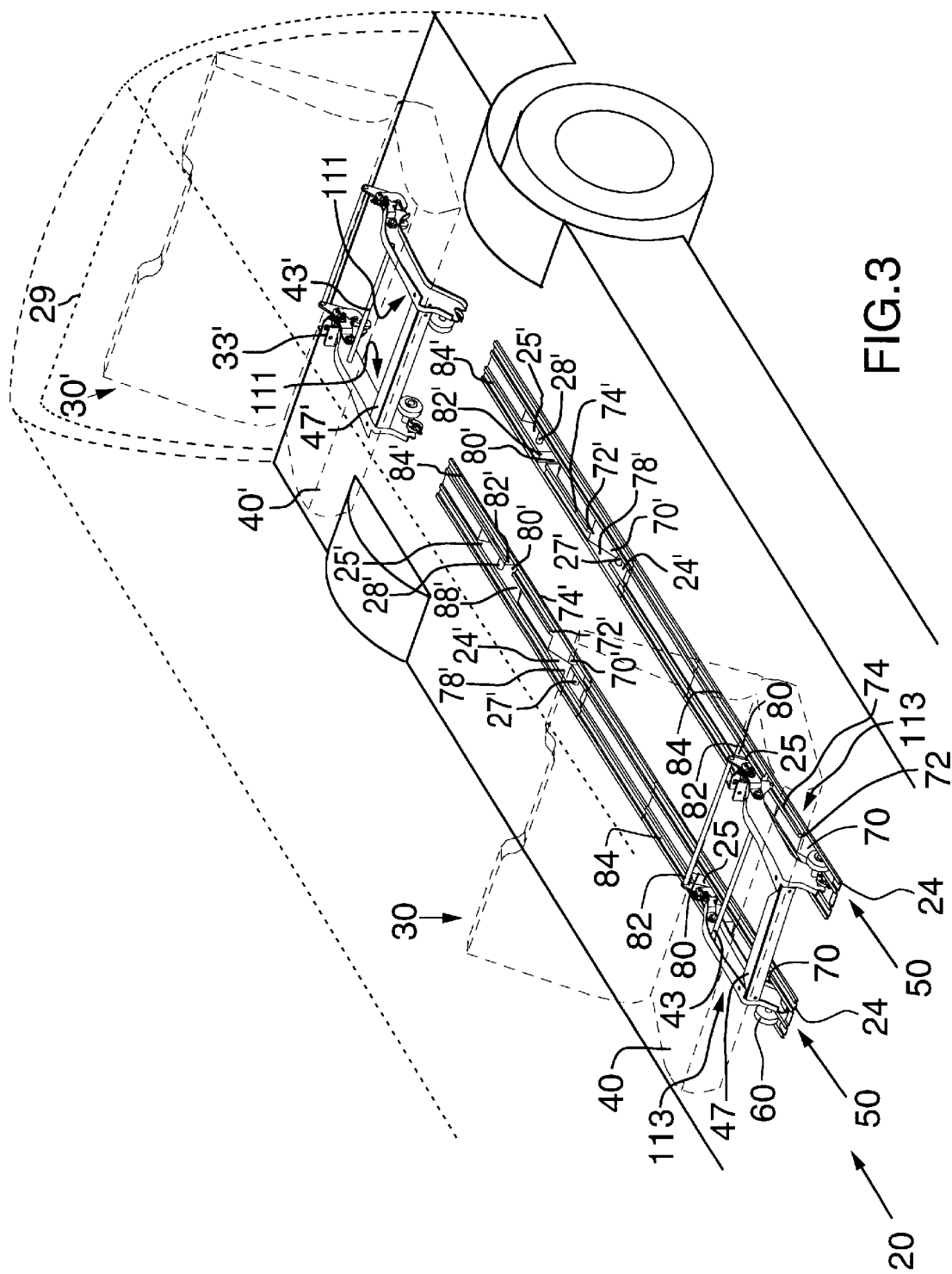
FIG. 3 is a perspective view similar to FIG. 2, with the rear (third row) vehicle seat assembly also being installed in the vehicle.
Figure 4:
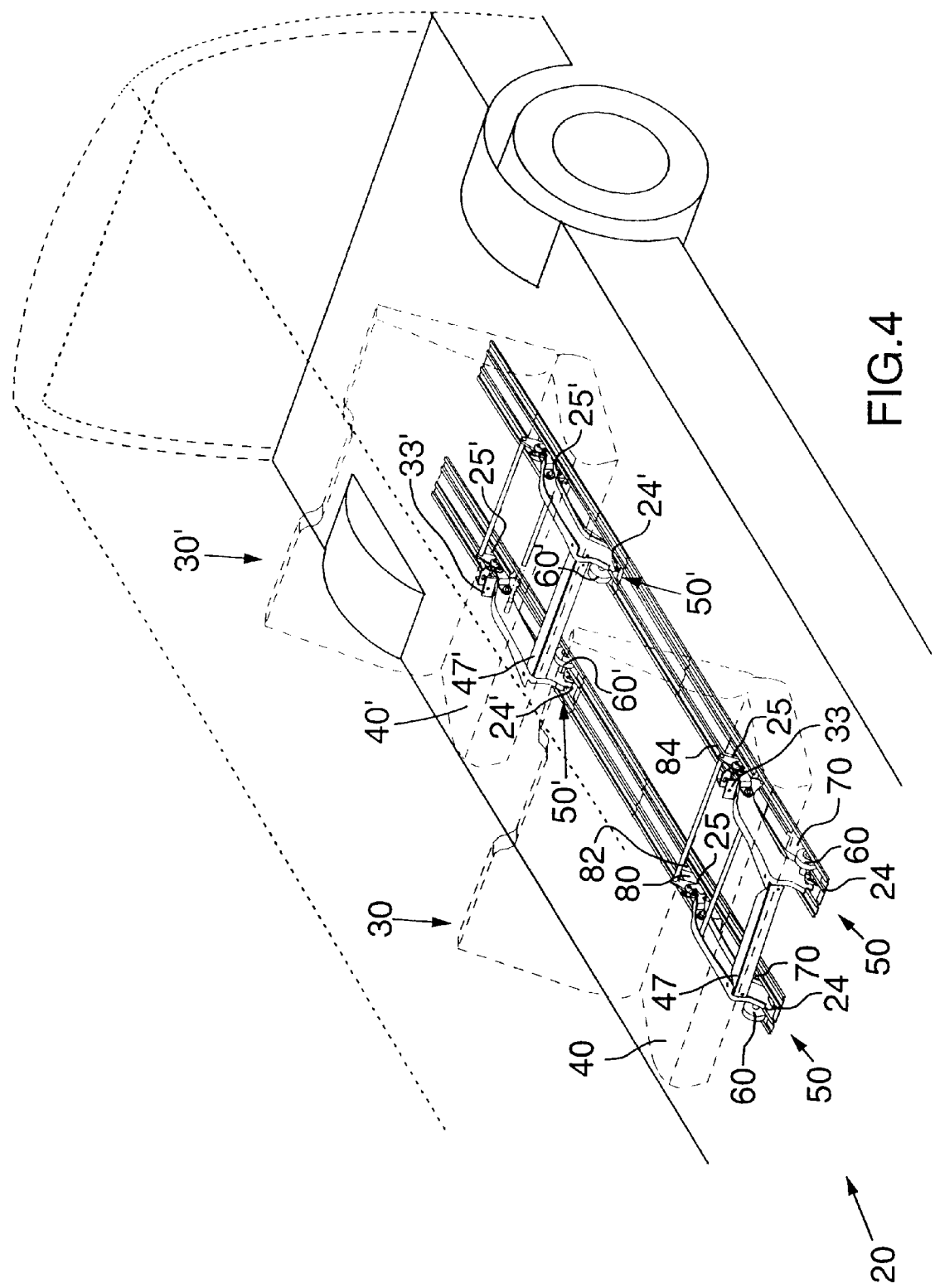
FIG. 4 is a perspective view similar to FIG. 3, with the rear (third row) vehicle seat assembly fully installed in the vehicle.

Referring now to FIGS. 1 through 13 of the drawings, there is shown a preferred embodiment of the vehicle seat system, as indicated by general reference numeral 20, according to the present invention, for use in a vehicle 22 including a floor 23 having an upwardly facing floor surface 26 covered by a conventional carpeting material.

The floor 23 has a first pair of front wells, comprising two laterally disposed front wells 24, and a first pair of rear wells, comprising two laterally disposed rear wells 25, disposed with respect to a longitudinal axis "A" (see FIG. 1) of the vehicle 22. The front wells 24 and rear wells 25 extend below the floor surface 26, and are formed as part of the floor 23 of the vehicle 22. Front anchor members 27 and rear anchor members 28 extend across the front wells 24 and rear wells 25, respectively, vertically positioned below the floor surface 26. The floor 23 also has a second pair of front wells, comprising two second front wells 24' and a second pair of rear wells, comprising two second rear wells 25' disposed, with respect to the longitudinal axis "A" of the vehicle 22, rearwardly from the front wells 24 and rear wells 25. The second front wells 24' and second rear wells 25' also extend below the floor surface 26, and are formed as part of the floor 23. Second front anchor members 27' and second rear anchor members 28', extend across the second front wells 24' and second rear wells 25', respectively, vertically positioned below the floor surface 26. The anchor members 27, 27', 28, and 28' are preferably of substantially circular cross-section, and are secured in place by any conventional means, such as welding.

As can best be seen in FIGS. 1 through 4, a vehicle seat system according to the invention preferably comprises two seat assemblies which are both sequentially positioned behind the driver's front row seat structure (not shown) which two seat assemblies comprise a first seat assembly, designated by the general reference numeral 30, and a second seat assembly, designated by the general reference numeral 30'. The first seat assembly is sometimes referred to in the art as a "second row" or "middle" seat assembly, but will, for the sake of brevity and consistency, be referred to hereinafter as the "first seat assembly". Similarly, the second seat assembly is sometimes referred to in the art as the "third row" or "rear" seat assembly, but will hereinafter be referred to as the "second seat assembly". Both the first seat assembly 30 and the second seat assembly 30' are placed into and removed from the vehicle 22 through a rear door opening 29. The first seat assembly 30 is first placed into the vehicle 22 through the rear door opening 29, as can be best seen in FIG. 1, and is then rolled into place so as to be received, in a manner more fully described below, by the front wells 24 and rear wells 25, as can be best seen in FIG. 2. The second vehicle seat assembly 30' is then placed into the vehicle 22 through the rear door opening 29, as can be best seen in FIG. 3, and is similarly rolled into place so as to be received by the second front wells 24' and second rear wells 25', as can be best seen in FIG. 4.

The first seat assembly 30 and the second seat assembly 30' are preferably substantially identical one to the other, although not necessarily so, except for a difference in the lateral placement thereon of wheel members, as will be discussed in greater detail subsequently. Accordingly, the structure of only the first seat assembly 30 will be described in detail, for the sake of brevity.

The first seat assembly 30 comprises a first cushioned seat structure 40 and a first pair of rigid support structures, comprising two rigid support structures 42 disposed adjacent laterally opposite ends of the first cushioned seat structure 40. The rigid support structures 42 are rigidly connected to each other in a conventional manner by means of a front cross-member 47 and a rear cross-member 43. The first cushioned seat structure 40 is mounted atop the rigid support structures 42 in any suitable conventional manner, as is well known in the industry. In the preferred embodiment illustrated in the Figures, this mounting is accomplished by means of a front cross-support 49 and a rear cross-support 48 each rigidly affixed to the first cushioned seat structure 40 adjacent its underside. These cross-supports 49,48, which each extend laterally under substantially the full width of the first cushioned seat structure 40 are, in turn, conventionally bolted to two upwardly directed receiving brackets, comprising a front receiving bracket 35 and a rear receiving bracket 33, which receiving brackets 35,33 are welded or otherwise operatively affixed to each of the rigid support structures 42 as shown.

A front connecting means, as indicated by general reference numeral 50, is provided on each rigid support structure 42, each front connecting means 50 being associated with and adapted for releasable, securing engagement with a respective one of the front anchor members 27 upon entry of the front connecting means 50 into the front wells 24. More specifically, the front connecting means 50 of each rigid support structure 42 comprises an open-ended slot 51 formed on said rigid support structure 42, for said releasable, securing, engagement with said respective one of the front anchor members 27, as will be discussed in greater detail subsequently. Such front connecting means 50 are of conventional construction, and may be of the same general type shown in U.S. Pat. No. 4,773,693, the teachings of which patent are hereby incorporated by reference.

A rear connecting means, as indicated by general reference numeral 52, is conventionally mounted on each of the rigid support structures 42, and is associated with and adapted for releasable, securing engagement with a respective one of the rear anchor members 28 upon entry of the rear connecting means 52 into the rear wells 25. More specifically, the rear connecting means 52 on each rigid support structure 42 comprises a rear hook member 53 pivotally mounted on said rigid support structure 42, for said releasable, securing, engagement with said respective one of the rear anchor members 28 upon entry of the rear connecting means 52 into the rear wells 25. The hook members 53 are connected together by a cross-bar 55 secured in place by, for example, threaded fasteners, so as to thereby effect coincident and equivalent pivotal movement of the hook members 53. Respective torsion springs 57 bias the hook members 53 towards said releasable, securing engagement with the rear anchor members 28, unless otherwise removed from latching engagement by manual manipulation of the cross-bar 55. Again, the rear connecting means 52 shown may take any known operative form, including that disclosed in U.S. Pat. No. 4,773,693, and are not to be restricted to the specific design shown herein.

A front wheel member 60 and a rear wheel member 62 are mounted in freely rotatable relation on an outboard side 113 of each of the rigid support structures 42, adjacent the respective front connecting means 50 and rear connecting means 52, respectively, so as to be in operative rolling contact with the floor surface 26 of the vehicle 22 when the front connecting means 50 and rear connecting means 52 are released from said securing engagement with their associated respective front anchor members 27 and rear anchor members 28. The front wheel members 60 are preferably of larger diameter than the rear wheel members 62, so as to pass over the rear wells 25 without falling thereinto, and are preferably constructed from a resiliently compressible rubberized material, for reasons as will be discussed subsequently.

There is also provided a pair of track entry positions, comprising two track entry positions 72, each track entry position 72 being positioned substantially level with said floor surface 26, such that each of said front wells 24 is disposed longitudinally frontwardly from a respective one of said track entry positions 72. A pair of front tracks, comprising two front tracks 70, is also provided, each front track 70 being positioned within a respective one of the front wells 24, and being associated with a respective one of the front wheel members 60. The front tracks 70 each extend frontwardly and downwardly, from a respective one of the track entry positions 72 aft of said respective one of the front wells 24 and atop the floor surface 26, to a base area 21 of said respective one of the front wells 24, which base area 21 is vertically positioned below the floor surface 26. Each of the front tracks 70 has a front track extension 74 extending horizontally, rearwardly atop the floor surface 26 from said respective one of the track entry positions 72 toward the rear door opening 29 of the vehicle 22. The front track extension 74 of each front track 70 preferably extends longitudinally rearwardly to a respective one of the rear wells 25 immediately behind the front well 24 associated with the front track extension 74. In this manner, the front track extension 74 provides a guided path for the respective front wheel member 60 upon forward rolling movement of the first cushioned seat structure 40 toward the front wells 24.

Figure 5:
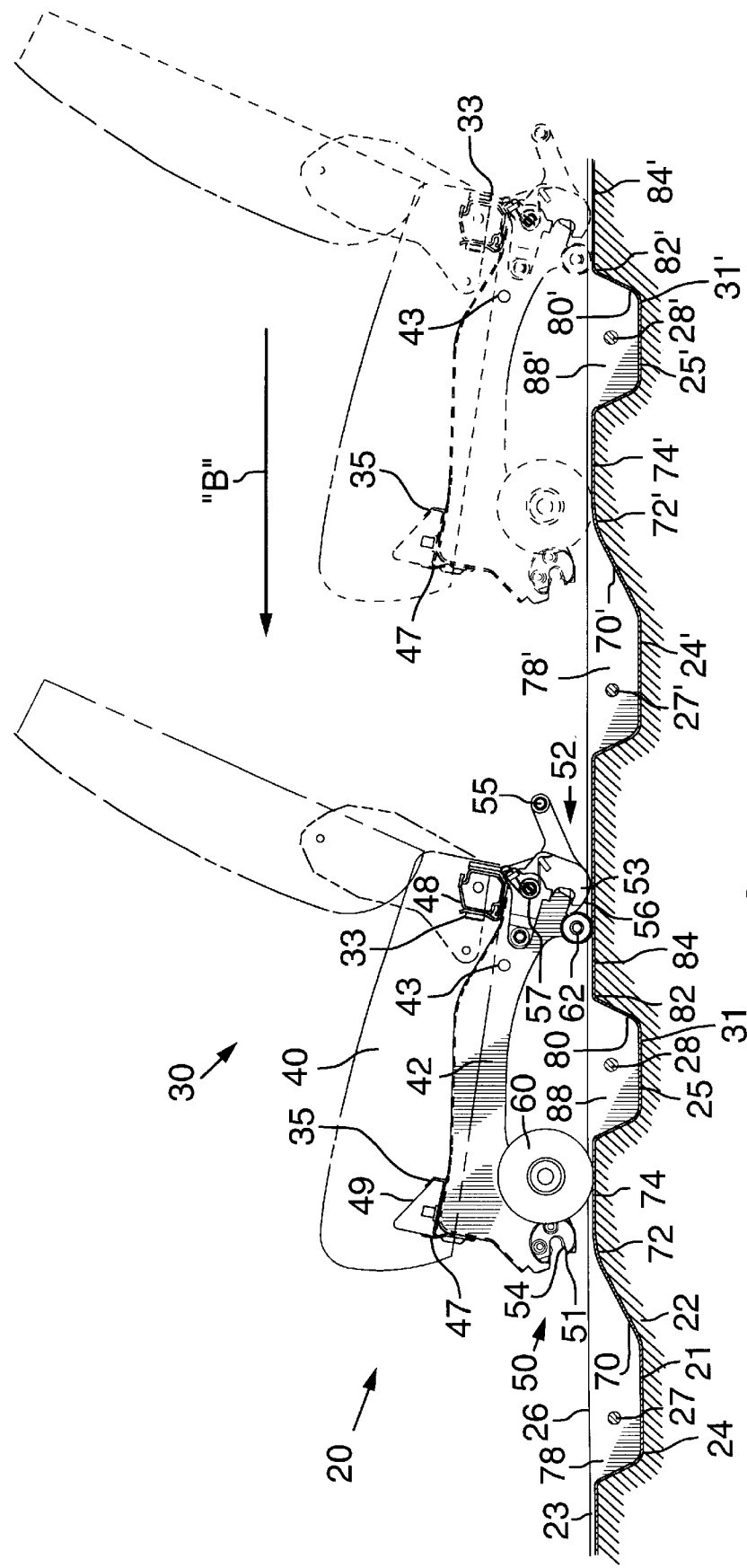
FIG. 5 is a cross-sectional, side elevational view of the preferred embodiment of vehicle seat system of FIG. 1, showing the middle (second row) vehicle seat assembly being installed into the vehicle.
Figure 6:
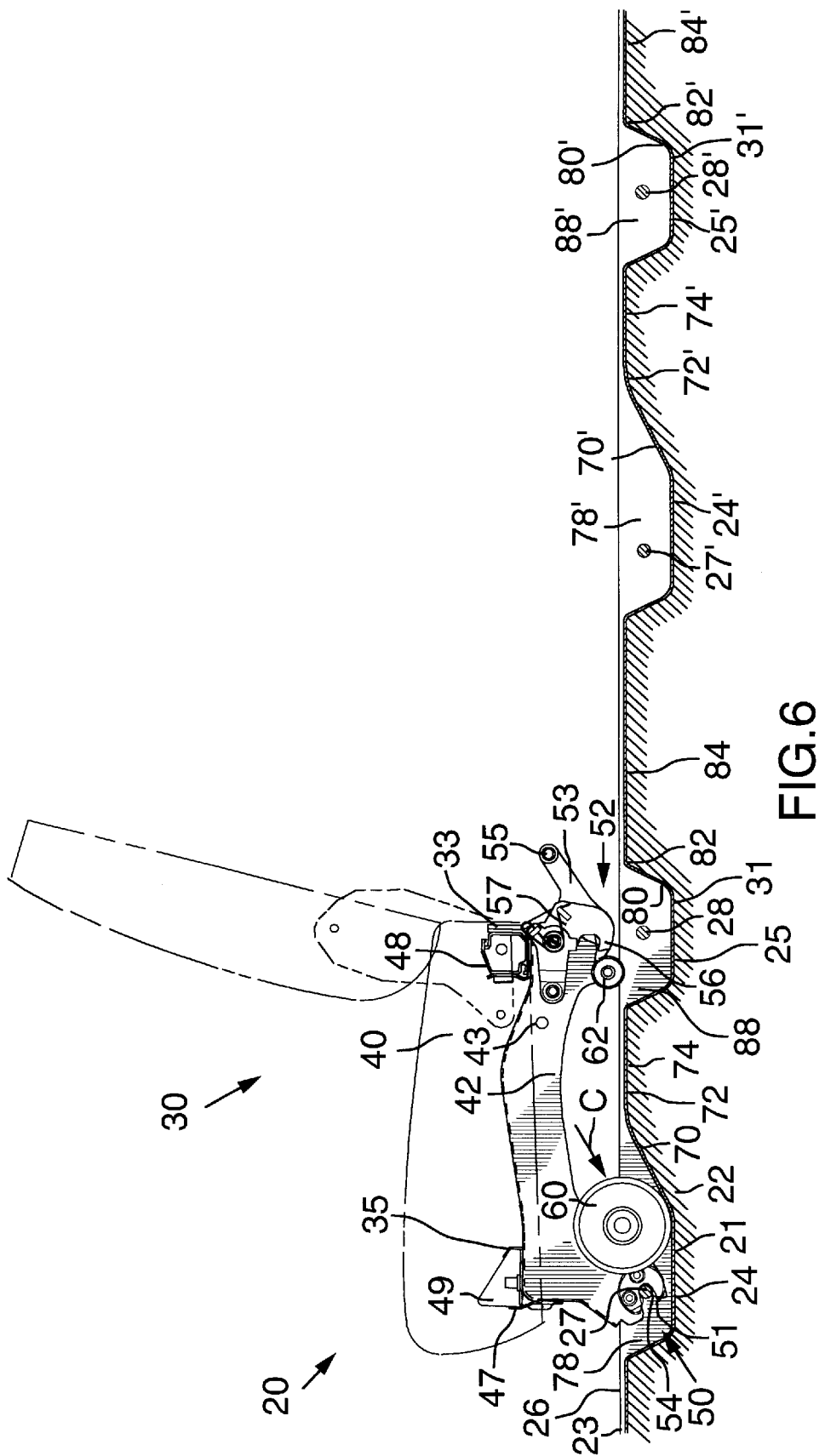
FIG. 6 is a view similar to FIG. 5, with the middle (second row) vehicle seat assembly partially in place, such that the front portions of the support rigid structures of the middle (second row) vehicle seat assembly are in place in the respective front wells, and with the rear portions of the rigid support structures about to be lowered into the respective rear wells.
Figure 7:
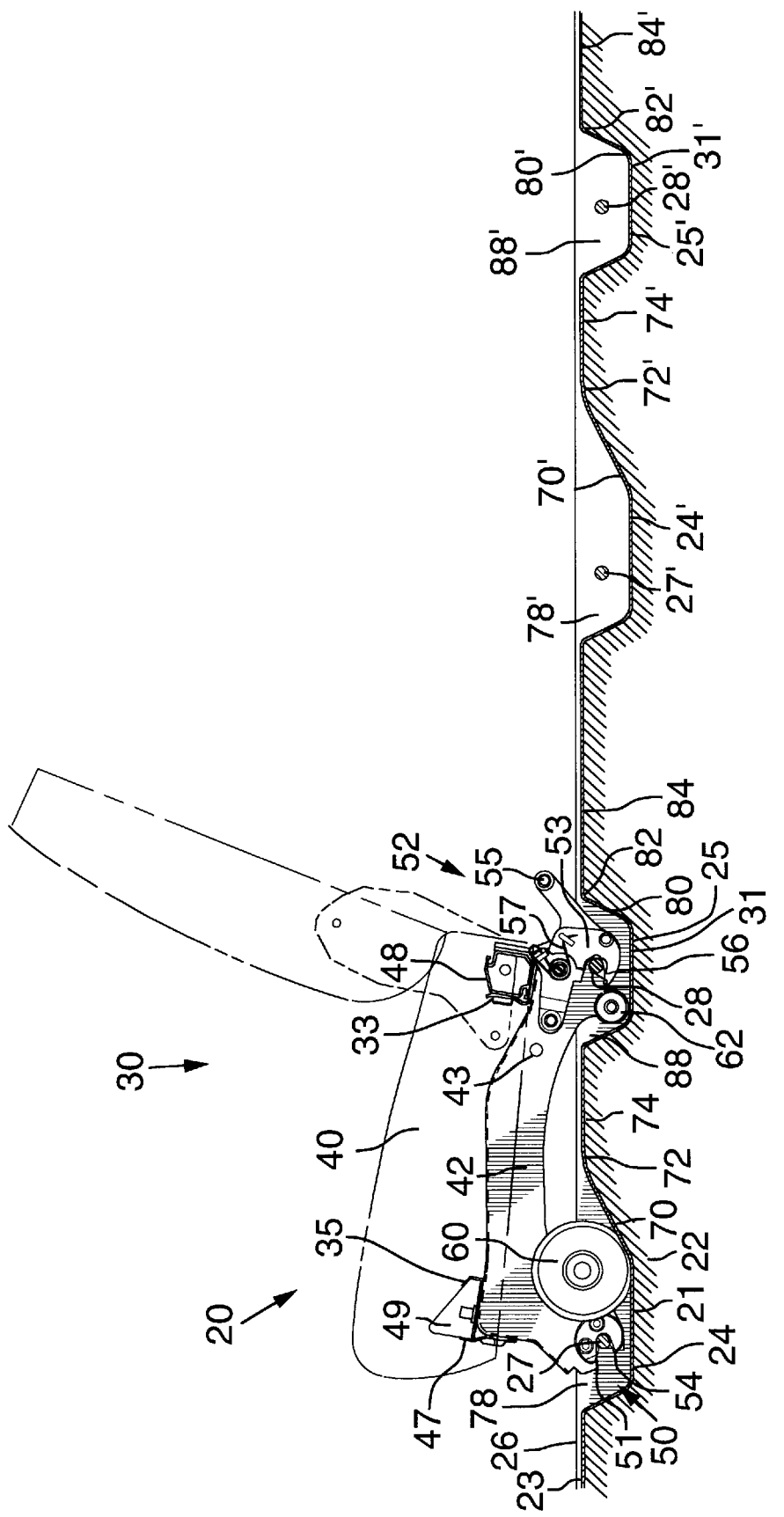
FIG. 7 is a view similar to FIG. 6, but with the rear portions of the rigid support structures of the middle (second row) vehicle seat assembly also in place in the respective rear wells.
Figure 9:
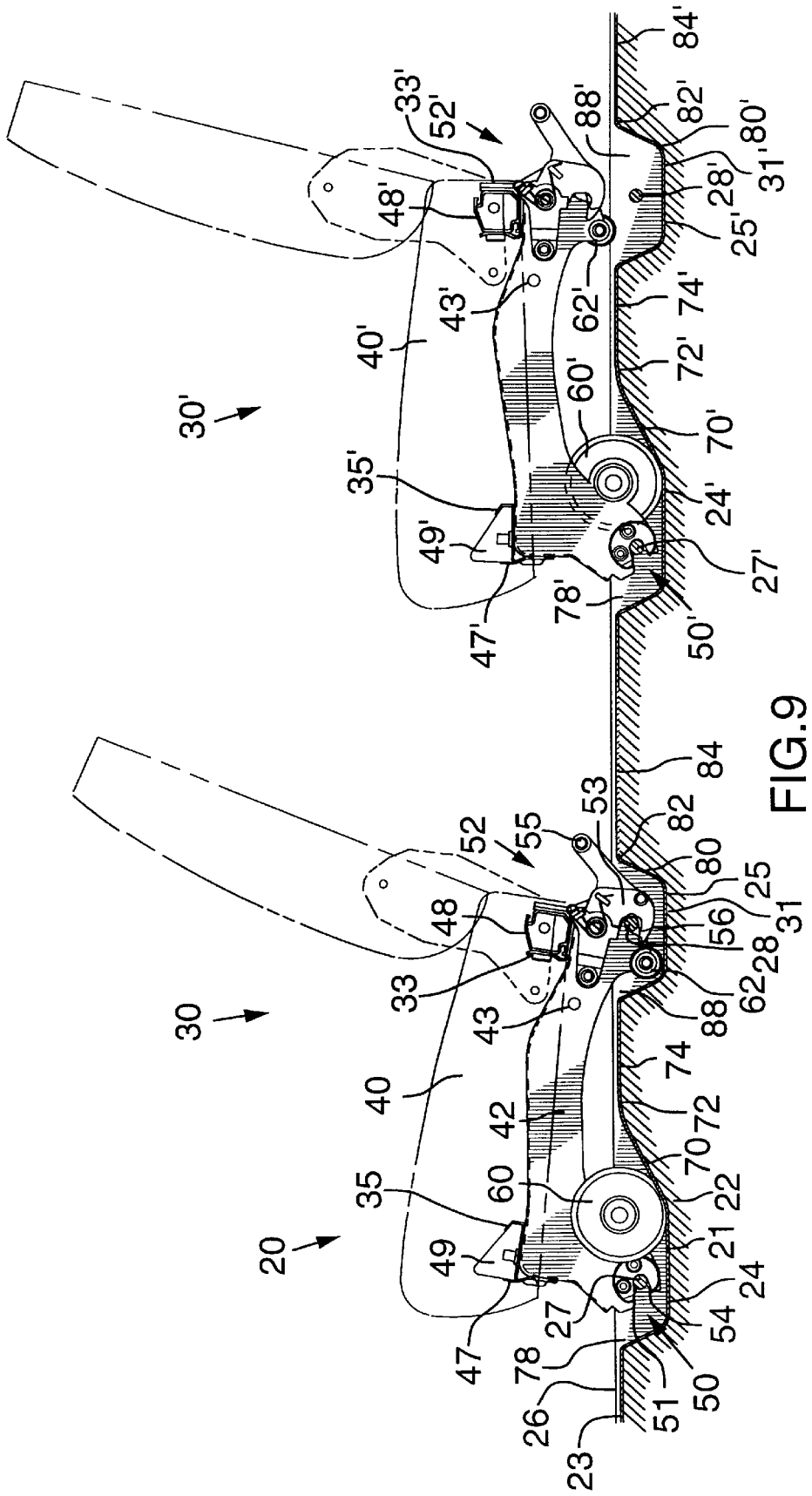
FIG. 9 is a view similar to FIG. 8, with the rear (third row) vehicle seat assembly partially in place, such that the front portions of the support rigid structures of the rear (third row) vehicle seat assembly are in place in the respective second front wells, and the rear portions of said second rigid support structures are about to be lowered into the respective second rear wells.

The front tracks 70 are each positioned on the floor 23 to accept, in guiding relation, a respective one of the front wheel members 60 upon forward rolling movement of the first cushioned seat structure 40, starting at a position as is best seen in FIG. 5. The front tracks 70 are shaped and dimensioned to thereafter guide each of the front wheel members 60, upon continued forward rolling movement, from the respective track entry position 72, as is best seen in FIG. 5, to the base area 21 of the associated front well 24, as is best seen in FIG. 6. Thereat the front connecting means 50 are permitted to each releasably, securely engage the respective ones of the front anchor members 27, thereby to releasably anchor the first cushioned seat structure 40 to the vehicle 22.

The open-ended slot 51 of each front connecting means 50 preferably has an upwardly, rearwardly sloping cam surface 54 on a lower edge 101 of the open-ended slot 51, which cam surface 54 has a progressive engagement with an underside 103 of the respective front anchor member 27 upon entry of the associated rigid support structure 42 into the base area 21 of the respective front well 24 as aforesaid. The open-ended slot 51 formed on the respective rigid support structure 42 thereby permits said releasable, securing engagement with the respective front anchor member 27, when the front wheel members 60 are each positioned in the base areas 21 of the respective front 24 wells. When the cam surface 54 progressively engages the underside 103 of the respective front anchor member 27 upon rolling entry of the associated rigid support structure 42 into the base area 21 of the respective front well 24 as aforesaid, the progressive engagement causes the front wheel members 60 to enter a state of resilient compression against the base areas 21 of the front wells 24. Such resilient compression aids in subsequent lifting of the rear portion of the first seat assembly 30 from the rear wells 25, when the rear connecting means 52 are disengaged from the rear anchor means 28.

The open ended slots 51 also permit upward, frontward pivotal movement of the rigid support structures 42, and the attached first cushioned seat structure 40, about the front anchor members 27 upon subsequent removal of the rear wheel members 62 from the rear wells 25 consequent upon upwardly, frontwardly lifting of a rear portion of the first cushioned seat structure 40, as seen in FIG. 6.

It can be seen that for removal of the vehicle seat assemblies, the open-ended slots 51 permit release of the front anchor members 27 from said releasable, securing engagement throughout a selected range of the upward, frontward pivotal movement of the rigid support structures 42 about the front anchor members 27. During this range of pivotal movement, the front wheel members 60 are positioned in operative rolling contact with the respective front tracks 70 to allow each to roll upwardly and rearwardly along the respective front track 70 to the track entry position 72. Thereafter, the front wheel members 60 are in operative rolling contact with the front track extensions 74, and after passing over the rear wells 25, with the floor surface 26 of the vehicle 22, thereby to permit subsequent rearwardly rolling removal of the first cushioned seat structure 40 from the rear door opening 29 in the vehicle 22.

A pair of rear entry positions 82 is associated one each with the pair of rear wells 25, such that the rear wells 25 are each disposed forwardly from the respective rear entry position 82. The rear entry positions 82 are each positioned on the floor 23 to accept, in downwardly through passing relation, a respective one of the rear wheel members 62 upon forward rolling movement of the first cushioned seat structure 40 to the respective rear entry positions 82. The rear entry positions 82 are also each positioned to thereafter permit entry of each of the rear wheel members 62 into the respective rear wells 25, upon continued forward rolling movement, from the respective rear entry position 82 to a base area 31 of the associated rear well 25. The rear connecting means 52 are thereat permitted to each releasably, securely engage the respective ones of the rear anchor members 28, thereby to releasably anchor the rear portions of the rigid support structures 42 and the first cushioned seat structure 40 attached thereto to the vehicle 22.

In the preferred embodiment shown, a pair of rear tracks, comprising two rear tracks 80, are also provided, the rear tracks 80 being associated one each with the pair of rear wells 25. The rear tracks 80 extend frontwardly and downwardly (more steeply than the front track means 70) from the respective rear entry position 82 positioned aft of the respective rear well 25, and atop the floor surface 26, to the base area 31 of the respective rear well 25 positioned below the floor surface 26. The rear tracks 80 are each positioned on the floor 23 to accept, in guiding relation, a respective one of the rear wheel members 62 upon forward rolling movement of the first cushioned seat structure 40 from the respective rear entry position 82. The rear tracks 80 are also each shaped and dimensioned to thereafter guide each of the rear wheel members 62, upon continued forward rolling movement, from the respective rear entry position 82 to the base area 31 of the associated rear well 25, and to thereat permit the rear connecting means 52 to each releasably, securely engage the respective ones of the rear anchor members 28, thereby to releasably anchor the first cushioned seat structure 40 to the vehicle 22.

Each of the rear track means 80 also has a rear track extension 84 extending longitudinally rearwardly atop the floor surface 26 from its associated rear entry position 82 toward the rear door opening 29 of the vehicle 22. The rear track extensions 84 provide a guided path for the respective rear wheel members 62 upon forward rolling movement of the first cushioned seat structure 40 toward the rear well 25.

The front track extension 74 and the rear track extension 84 are longitudinally aligned with one another. Accordingly, the front wheel members 60 and rear wheel members 62 mounted on each separate side of the vehicle seat assembly 30 each pass over both the respective front track extensions 74 and respective rear track extensions 84. In order to preclude the front wheel members 60 from falling into the rear wells 25, the longitudinal separation 109 between the front track extensions 74 and the rear track extensions 84 is less than the diameter 105 of the front wheel members 60, but greater than the diameter 107 of the rear wheel members 62, so as to permit the front wheel members 60 to roll over the rear wells 25 upon forward rolling of the first cushioned seat structure 40 toward the respective track entry positions 72 associated with the respective ones of the front wells 24.

As can be best seen in FIGS. 1 through 4, the front wheel members 60 and the rear wheel members 62 are each preferably mounted on the outboard side 113 of the rigid support structures 42, in laterally spaced relation from the respective rigid support structure 42, and in equal laterally spaced relation to the front tracks 70, the front track extensions 74, the rear tracks 80, and the rear track extensions 84.

As can be best seen in FIG. 5–12, each of the front wheel members 60 is mounted as aforesaid on the outboard side 113 of the respective rigid support structures 42 in such a manner that the front wheel members 60 are each in longitudinally spaced relation from the corresponding rear wheel member 62, which longitudinally spaced relation, it will be noted, is also equal to the laterally spaced relation of the front wells 24 and rear wells 25 which respectively accommodate the front wheel members 60 and rear wheel members 62.

In the preferred embodiment shown, the front tracks 70, the front track extensions 74, the rear tracks 80 and the rear track extensions 84 are formed, together with a front well liner 78, and a rear well liner 88, as a unitary molded piece, from a plastics material.

As discussed above, the vehicle seat system 20 of the preferred embodiment of the present invention also comprises a second vehicle seat assembly 30' substantially identical to the first vehicle seat assembly 30, comprising a second cushioned seat structure 40', two second rigid support structures 42', two second front connecting means 50', two second rear connecting means 52', two second front wheel members 60' and two second rear wheel members 62', two second front tracks 70' and respective second track entry positions 72', two second front track extensions 74', two second front well liners 78', two second rear tracks 80' and respective second rear entry positions 82', two second rear track extensions 84', and two second rear well liners 88'. The vehicle seat system 20 additionally comprises a second front receiving bracket 35', a second rear receiving bracket 33', a second front cross-member 43', a second rear cross-member 47', second torsion springs 57', second sloped contact portions 56', a second rear cross support 48', and a second front cross support 49', with all components of the second seat assembly 30' being assembled in analogous fashion to that previously described relating to the first seat assembly 30. Additionally, the second front wells 27' have respective base areas thereof 21', and the second rear wells 38' have respective base areas 31' thereof.

Figure 13:
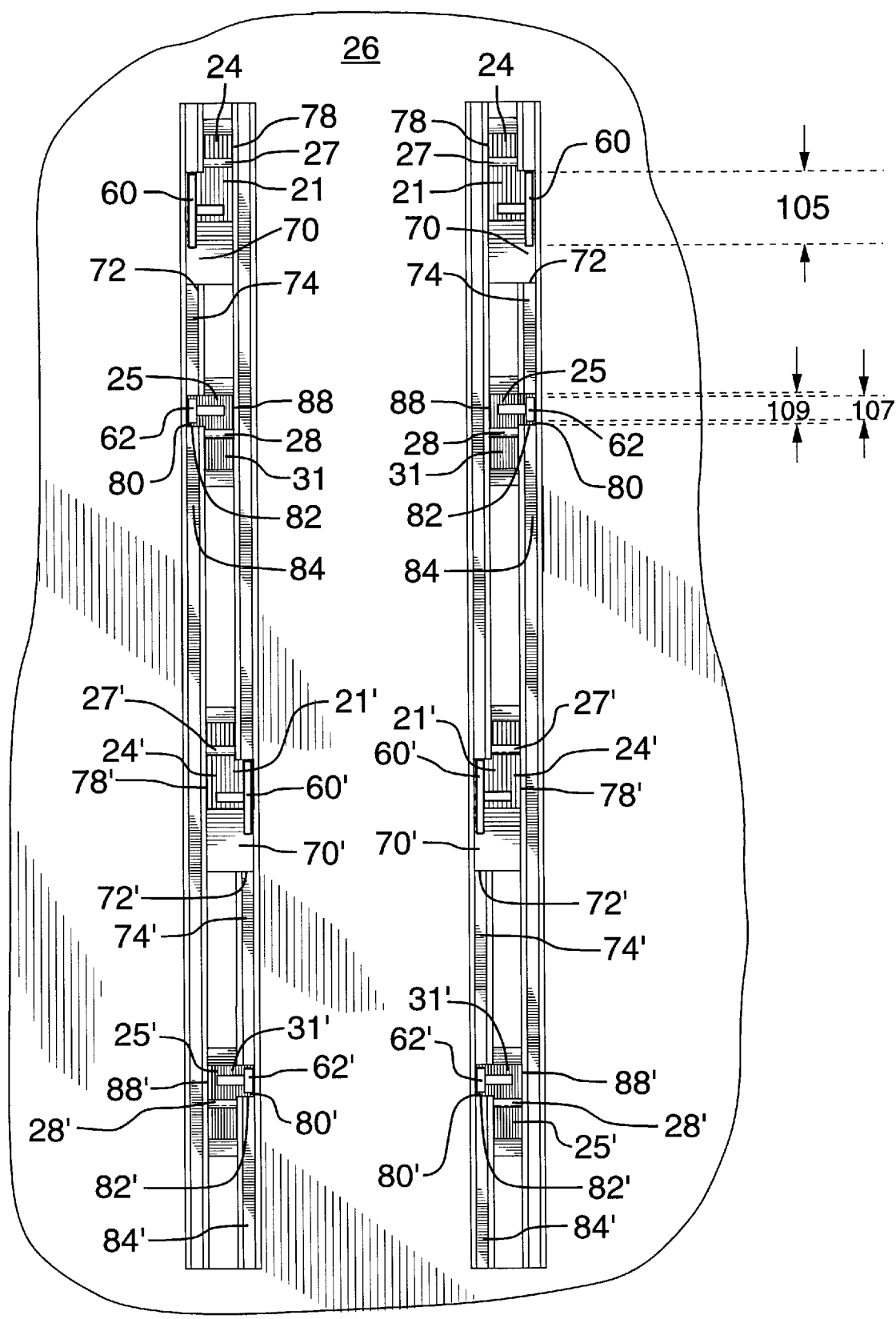

As can best be seen in FIG. 13, the second rigid support structures 42', are laterally spaced from one another a distance substantially equal to the lateral spacing between the rigid support structures 42 of the first seat assembly 30. Preferably, the second front wheel members 60' and the second rear wheel members 62' are each mounted, in contrast to the first seat assembly 30, on an inboard side 111 of the second rigid support structures 42' in laterally spaced relation equal to the laterally spaced relation of the second front tracks 70', the second front track extensions 74', the second rear tracks 80' and the second rear track extensions 84', such that the second front wheel members 60' and the second rear wheel members 62' will operatively align themselves only with the second front tracks 70' and the second rear tracks 80' for rolling movement as aforesaid into the respective ones of the second front wells 24' and the second rear wells 25'. The inboardly mounted second front wheel member 60' and second rear wheel members 62' of the second seat assembly 30' therefore cannot enter the front wells 24 and rear wells 25, and the outboardly mounted front wheel members 60 and rear wheel members 62 of the first seat assembly 30 therefore cannot enter the second front wells 24' and second rear wells 25'. In this manner, the first seat assembly 30 will not engage at the position of the second seat assembly 30', but will roll therepast to its proper position, and the second seat assembly 30' will not engage at the position of the first seat assembly 30, but can be readily returned to its proper position, in the event that it initially rolls past its proper position. This is especially important if design considerations, such as seat belt anchoring points or loading for the first seat assembly 30 are different than for the second seat assembly 30'.

In use, the vehicle seat system 20 of the present invention functions in the following manner, as will now be described with reference to FIGS. 5 through 12, which Figures show the installation of the first seat assembly 30 and second seat assembly 30' into the vehicle 22 and their subsequent removal therefrom. The first seat assembly 30 is first lifted into the vehicle 22 through the rear door opening 29, and is then rolled past the second front wells 24' and second rear wells 25' for the second vehicle seat assembly 30', as is shown in ghost outline in FIG. 5. It is then rolled toward the front wells 24 and rear wells 25, as is indicated by arrow "B" in FIG. 5, until the front wheel members 60 each reach their respective track entry positions 72. Upon continued forward rolling movement of the first seat assembly 30, the front wheel members 60 roll down along the front tracks 70, as is indicated by arrow "C" in FIG. 6, until the front wheel members 60 reach the base areas 21 of the respective front wells 24. Thereat, the front connecting means 50 are permitted to each releasably, securely engage the respective ones of the front anchor members 27. The rear portion of the first seat assembly 30 is then lowered by a user onto the rear anchor members 28, whereat sloped contact portions 56 on the hook members 53 slidingly contact the rear anchor members 28 so as to rotate the hook members 53 against the torsion springs 57, thus permitting the hook members 53 to advance around the rear anchor members 28. The hook members 53 then releasably, securingly engage the respective rear anchor members 28, thereby to releasably anchor the first seat assembly 30 to the vehicle 22, as can be best seen in FIG. 7. The front wheel members 60, which are preferably made from a resiliently compressible rubberized material, because of their relatively larger size than the rear wheel members 62, are retained in the state of resilient compression by the releasable securing engagement of the rear anchor members 28 by the rear hook members 53.

The second seat assembly 30' is then lifted into the vehicle 22 through the rear door opening 29, and rolled into place, as can be best seen in FIG. 8, in a manner analogous to the first seat assembly 30. Upon continued forward rolling movement of the second seat assembly 30', the second front wheel members 60' each roll down along the second front tracks 70', until the second front wheel members 60' each reach a base area 21' of the respective second front well 24', as can be best seen in FIG. 9. The rear portion of the second seat assembly 30' is then lowered into the second rear wells 25' until the second rear wheel members 62' reach base areas 31' of the second rear wells 25', thus permitting the second hook members 53' to advance around the second rear anchor members 28', and releasably securingly engage the respective second rear anchor members 28', thereby to releasably anchor the second vehicle seat assembly 30' to the vehicle 22, as can be best seen in FIG. 10.

The second front wheel members 60', which are preferably made from a resiliently compressible rubberized material, because of their relatively larger size, are retained in the state of resilient compression by the releasable securing engagement of the second rear anchor members 28' by the second rear hook members 53'.

Figure 11:
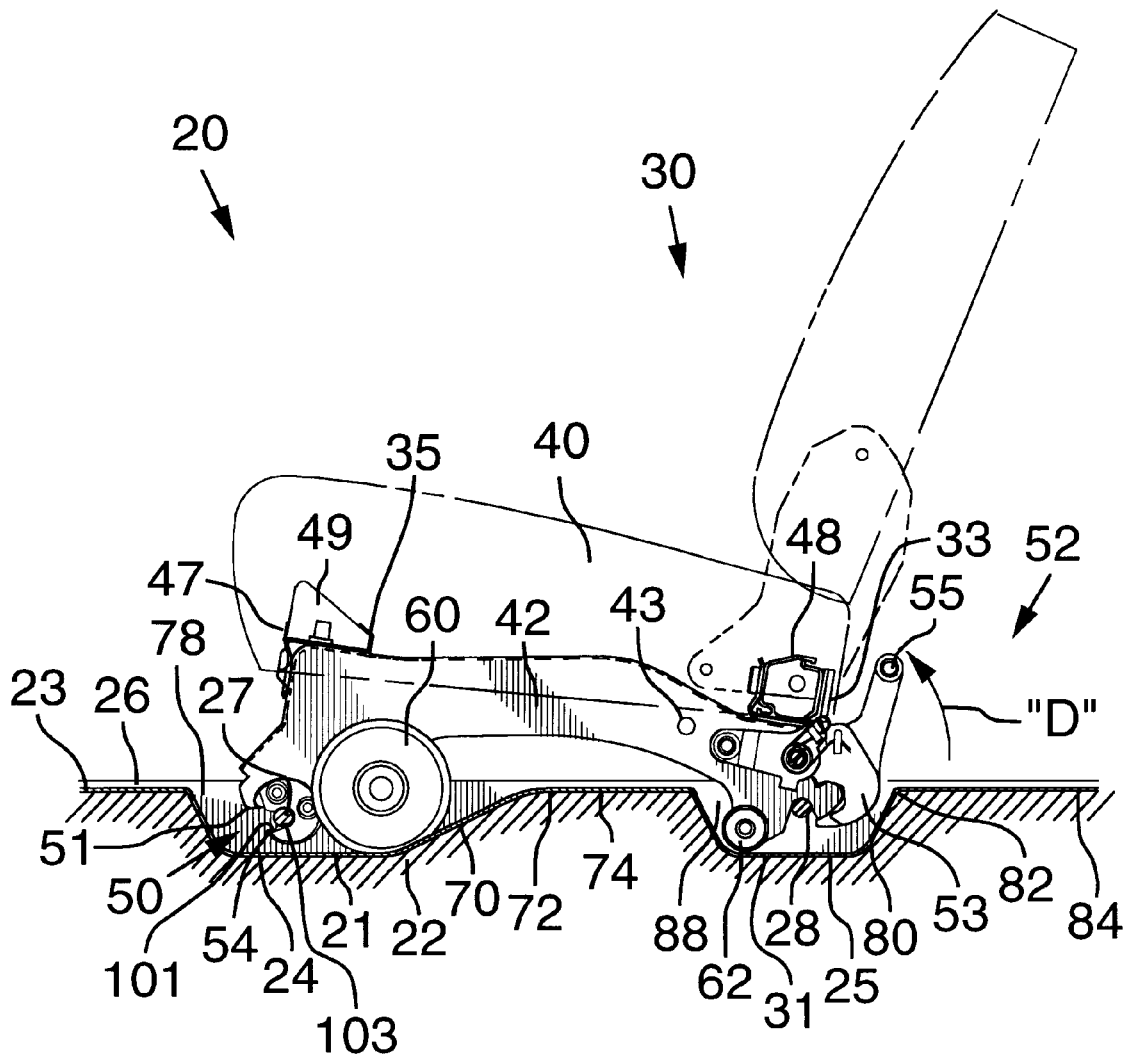
FIG. 11 is a cross-sectional, side elevational view of the preferred embodiment of the vehicle seat system of FIG. 1, showing only the middle (second row) vehicle seat assembly, with that vehicle seat assembly having its rear locking means released for subsequent removal of the vehicle seat assembly.
Figure 12:
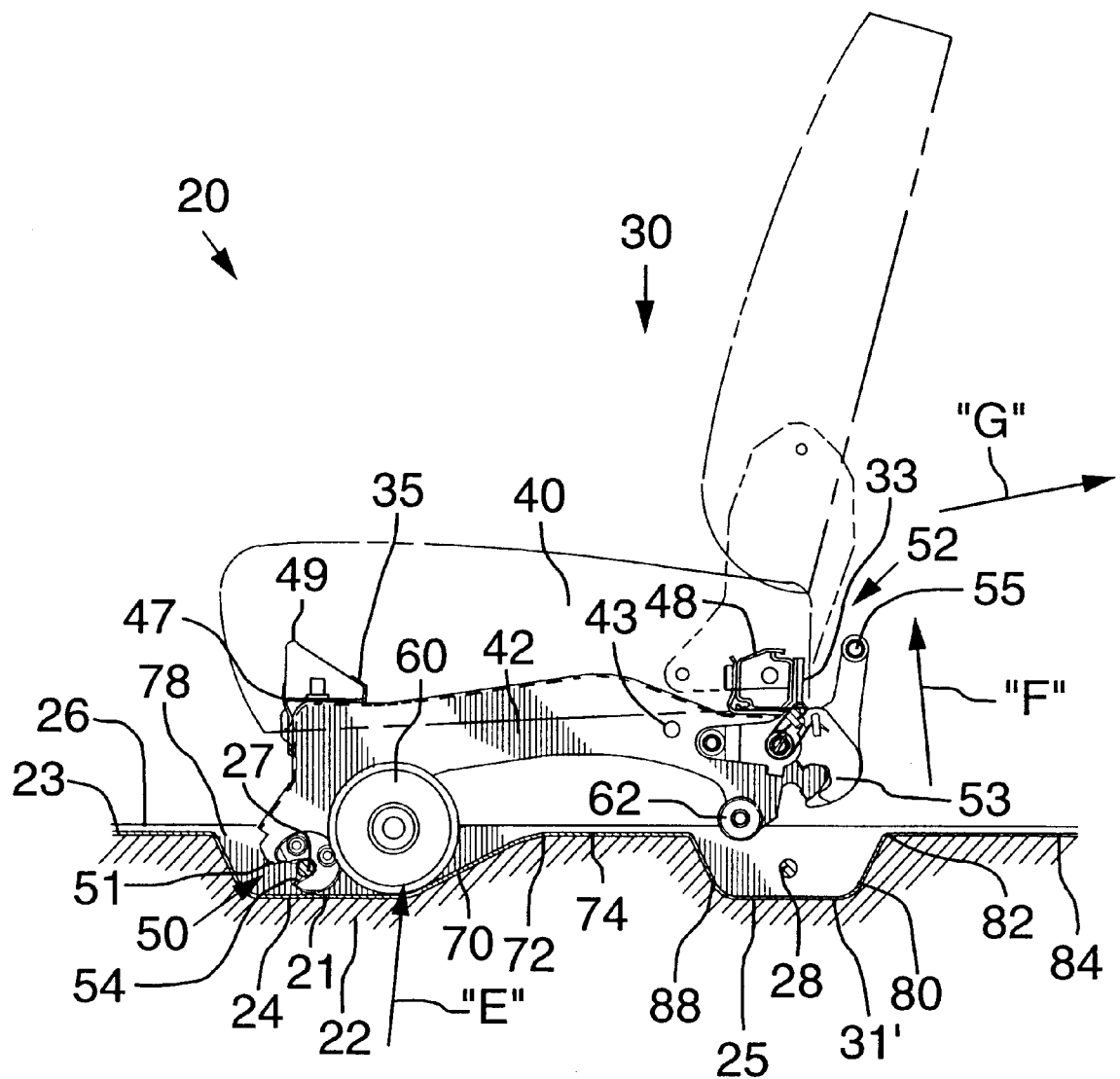
FIG. 12 is a view similar to FIG. 11, with the middle (second row) vehicle seat assembly partially removed; and, FIG. 13 is a top plan view of the floor of the vehicle of FIGS. 1–12, diagrammatically showing the positioning of the wheel members of the vehicle seat system of said Figures, when the middle (second row) and rear (third row) vehicle seat assemblies are both fully installed in the vehicle.

In order to remove the first seat assembly 30 from the vehicle 22, the cross-bar 55, which connects the two rear connecting members 52 to each other, is lifted by the user, as indicated by arrow "D" in FIG. 11. This causes release of the rear anchor members 28 by the rear hook members 53, which in turn causes the front wheel members 60 to be released from the aforementioned state of resilient compression, as indicated by arrow "E" in FIG. 12, thereby assisting a user to effect the upward, frontward pivotal movement of the rigid support structures 42, and the attached first cushioned seat structure 40 about the front anchor members 27, as indicated by arrow "F" in FIG. 12. The first seat assembly 30 can then be rolled rearwardly, as indicated by arrow "G" in FIG. 12, toward the rear door opening 29. An analogous releasing technique is utilized with respect to the second seat assembly 30'.

I claim:

1. A vehicle seat system for use with a vehicle having a longitudinal axis and a floor, said floor having an upwardly facing floor surface, a first pair of front wells, comprising two laterally disposed front wells, and a first pair of rear wells, comprising two laterally disposed rear wells, said first pair of rear wells being disposed longitudinally rearwardly with respect to said first pair of front wells, each of said front wells extending below said floor surface and having a front anchor member extending thereacross and being vertically positioned below said floor surface, and each of said rear wells extending below said floor surface and having a rear anchor member extending thereacross and being vertically positioned below said floor surface, said vehicle seat system comprising:

a first seat assembly comprising:
 a first cushioned seat structure;
 a first pair of rigid support structures, comprising two rigid support structures, disposed adjacent laterally opposite ends of said first cushioned seat structure, with said first cushioned seat structure being mounted on said first pair of rigid support structures;
 a front connecting means on each of said rigid support structures, each of said front connecting means being associated with and adapted for releasable, securing engagement with a respective one of said front anchor members, upon entry of the front connecting means into said front wells;

a rear connecting means on each of said rigid support structures, each of said rear connecting means being associated with and adapted for releasable, securing engagement with a respective one of said rear anchor members, upon entry of the rear connecting means into said rear wells;

a front wheel member mounted on each rigid support structure in nonretractable, rotatable fixed relation thereto, adjacent to the front connecting means thereof, and being associated with a respective one of said front wells;

a rear wheel member mounted on each rigid support structure in nonretractable, rotatable fixed relation thereto, adjacent to the rear connecting means thereof;

a pair of track entry positions, comprising two track entry positions, each track entry position being positioned substantially level with said floor surface, such that each of said front wells is disposed longitudinally frontwardly from a respective one of said track entry positions; and a pair of front tracks, comprising two front tracks, positioned one each within said front wells;

said front wheel members and said rear wheel members further being adapted to permit longitudinal rolling movement of the first seat assembly when the first seat assembly is operatively positioned with the front wheel members upon the front tracks and with the rear wheel members upon the floor surface and when the first seat assembly is operatively positioned with the front wheel members upon the floor surface and the rear wheel members upon the floor surface, when each of the front connecting means is released from said releasable, securing engagement with the respective front anchor member, and when each of the rear connecting means is released from said releasable, securing engagement with the respective rear anchor member;

each of said front tracks being associated with a respective one of said front wheel members and extending within the respective front well longitudinally frontwardly and downwardly from the track entry position relative to which the respective front well is disposed longitudinally frontwardly, to a base area, vertically positioned below said floor surface, of said respective front well, each front track being adapted to guidingly accept the respective front wheel member for longitudinal rolling movement of the respective front wheel member from said track entry position relative to which the respective front well is disposed longitudinally frontwardly to said base area of said respective front well, and to thereat permit the front anchor member of said respective front well to enter said releasable, securing engagement with a respective one of the front connecting means, thereby to releasably, securingly anchor the first seat assembly to the vehicle;

the rear wheel members and the rear connecting means further being adapted, such that, when the front wheels are operatively positioned in the base areas of the front wells, the rear wheel members and the rear connecting means are positioned in the rear wells, thereby to permit each rear connecting means to enter said releasable, securing engagement with the respective rear anchor member, thereby to releasably, securingly anchor the first seat assembly to the vehicle.

2. A vehicle seat system according to claim 1, further comprising:

a pair of rear entry positions, comprising two rear entry positions, each rear entry position being positioned substantially level with the floor surface, such that each of said rear wells is disposed longitudinally frontwardly from a respective one of said rear entry positions; and a pair of rear tracks, comprising two rear tricks, each rear track being associated with a respective one of the rear wheel members, being positioned within a respective one of the rear wells and extending longitudinally frontwardly and downwardly from the rear entry position relative to which the reactive rear well is disposed longitudinally frontwardly to a base area, vertically positioned below the floor surface, of the respective rear well;

said rear wheel members further being adapted to permit said longitudinal rolling movement of the first seat assembly when the first seat assembly is operatively positioned with the front wheel members upon the front tracks and the rear wheel members upon the rear tracks, when each of the front connecting means is released from said releasable, securing engagement with the respective front anchor member, and when each of the rear connecting means is released from said releasable, securing engagement with the respective rear anchor member.

3. A vehicle seat system according to claim 2, wherein said front anchor members are of substantially circular cross section and the front connecting means on each of the rigid support structures each comprises an open-ended slot formed thereon for said releasable, securing engagement with the respective front anchor member when the front wheel member of each rigid support structure is positioned in the base area of the respective front well and wherein said front anchor members are adapted so as to permit upward, frontward pivotal movement and downward, rearward pivotal movement of the first seat assembly about said front anchor members.

4. A vehicle seat system according to claim 3, wherein said open-ended slots are adapted to permit said upward, frontward pivotal movement and a downward, rearward pivotal movement of the first seat assembly about the front anchor members throughout a selected range of rotation, throughout which selected range of rotation, the front wheel members being positioned upon the front tracks to allow said front wheel members to roll upwardly and rearwardly along said front tracks to the track entry positions.

5. A vehicle seat system according to claim 4, wherein the rear connecting means on each rigid support structure comprises a rear hook member pivotally mounted on said each rigid support structure.

6. A vehicle seat system according to claim 5, wherein the front wheel members each have a front wheel diameter, the rear wheel members each have a rear wheel diameter, wherein the front wheel diameter is larger than the rear wheel diameter; and wherein said front wheel members and said rear wheel members are constructed from a resiliently compressible rubberized material.

7. A vehicle seat system according to claim 6, wherein the open-ended slot of each front connecting means has an upwardly, rearwardly sloping cam surface on a lower edge of said open-ended slot, said upwardly, rearwardly sloping cam surface providing for a progressive engagement with an underside of the respective front anchor member associated with said each front connecting means upon rolling movement of the front wheel members into the base areas of the front wells, said progressive engagement causing said front wheel members to enter a state of resilient compression against the front tracks and against the front wells.

8. A vehicle seat system according to claim 7, wherein the front wheel members are retained in said state of resilient compression by said releasable, securing engagement of the rear anchor members by the rear connecting means.

9. A vehicle seat system according to claim 8, wherein release of the rear anchor members by the rear connecting means causes the front wheel members to be released from said state of resilient compression, thereby assisting a user to effect said upward, frontward pivotal movement of the first seat assembly about the front anchor members.

10. A vehicle seat system according to claim 9, wherein the rear connecting means are biased toward said releasable, securing engagement with the rear anchor members.

11. A vehicle seat system according to claim 10, wherein each said front track extending within the respective front well longitudinally frontwardly and downwardly from the track entry position relative to which the respective front well is disposed longitudinally frontwardly has a front track extension extending longitudinally, rearwardly atop the floor surface from said track entry position relative to which the respective front well is disposed longitudinally frontwardly toward a rear opening of the vehicle.

12. A vehicle seat system according to claim 11, wherein the front track extensions respectively extend longitudinally rearwardly to the rear wells.

13. A vehicle seat system according to claim 12, wherein each said rear track extending longitudinally frontwardly and downwardly from the rear entry position relative to which the respective rear well is disposed longitudinally frontwardly has a rear track extension extending longitudinally rearwardly atop the floor surface from said rear entry position relative to which the respective rear well is disposed longitudinally frontwardly toward said rear opening of the vehicle, said front wheel members and said rear wheel members further being adapted to permit said longitudinal rolling movement of the first seat assembly when the first seat assembly is operatively positioned with the front wheel members upon the front track extensions and the rear wheel members upon the rear track extensions.

14. A vehicle seat system according to claim 13, further comprising a first pair of front well liners, comprising two front well liners, and a first pair of rear well liners, comprising two rear well liners.

15. A vehicle seat system according to claim 14, wherein the front track extensions are longitudinally displaced from the rear track extensions a distance that is less than the front wheel diameter, but greater than the rear wheel diameter, so as to permit the front wheel members to roll over the rear wells upon said longitudinal rolling movement of the first seat assembly.

16. A vehicle seat system according to claim 15, wherein the front wheel members and the rear wheel members are mounted on an outboard side of each rigid support structure and wherein the front wheel members, the rear wheel members, the front tracks, the front track extensions, the rear tracks, the rear track extensions, the front wells, and the rear wells are, respectively, mounted and positioned in parallel, longitudinal alignment.

17. A vehicle sear system according to claim 16, wherein said floor further has a pair of second front wells, comprising two laterally disposed second front wells, and a pair of second rear wells, comprising two laterally disposed second rear wells, said pair of second front wells being disposed longitudinally rearwardly with respect to the first pair of rear wells, said pair of second rear wells being disposed longitudinally rearwardly with respect to said pair of second front wells, each of said second front wells extending below said floor surface and each having a second front anchor member extending thereacross and being vertically positioned below said floor surface, and each of said second rear wells having a second rear anchor member extending thereacross and being vertically positioned below said floor surface, said vehicle seat system additionally comprising:

a second seat assembly comprising:
  a second cushioned seat structure;
  a second pair of rigid support structures, comprising two second rigid support structures, disposed adjacent laterally opposite ends of said second cushioned seat structure, with said second cushioned seat structure being mounted on said second pair of rigid support structures;
  a second front connecting means on each of said second rigid support structures, each of said second front connecting means being associated with and adapted for releasable, securing engagement with a respective one of said second front anchor members, upon entry of the second front connecting means into said second front wells;
  a second rear connecting means on each of said second rigid support structures, each of said second rear connecting means being associated with and adapted for releasable, securing engagement with a respective one of said second rear anchor members, upon entry of the second rear connecting means into said second rear wells;
  a second front wheel member mounted on each second rigid support structure in nonretractable, rotatable fixed relation thereto, adjacent to the second front connecting means thereof, and being associated with a respective one of said second front wells;
  a second rear wheel member mounted on each second rigid support structure in nonretractable, rotatable fixed relation thereto, adjacent to the second rear connecting means thereof;

a pair of second track entry positions, comprising two second track entry positions, each second track entry position being positioned substantially level with the floor surface, such that each of the second front wells is disposed longitudinally frontwardly from a respective one of said second track entry positions;

a pair of second front tracks, comprising two second front tracks, positioned one each within said second front wells;

a pair of second rear entry positions, comprising two second rear entry positions, each second rear entry position being positioned substantially level with the floor surface, such that each of the second rear wells is disposed longitudinally frontwardly from a respective one of said second rear entry positions; and a pair of second rear tracks, comprising two second rear tracks, each being positioned within a respective one of the second rear wells;

said second front wheel members and said second rear wheel members further being adapted to permit longitudinal rolling movement of the second seat assembly when the second seat assembly is operatively positioned with the second front wheel members upon the second front tracks and with the second rear wheel members upon the floor surface, when the second seat assembly is operatively positioned with the second front wheel members upon the floor surface and the second rear wheel members upon the floor surface, and when the second seat assembly is operatively positioned with the second front wheel members upon the second front tracks and with the second rear wheel members upon the second rear tracks, when each of the second front connecting means is released from said releasable, securing engagement with the respective second front anchor member, and when each of the second rear connecting means is released from said releasable, securing engagement with the respective second rear anchor member;

each of said second front tracks being associated with a respective one of the second front wheel members and extending within the respective second front well longitudinally frontwardly and downwardly from the second track entry position relative to which the respective second front well is disposed longitudinally frontwardly, to a base area, vertically positioned below the floor surface, of the respective second front well, each second front track being adapted to guidingly accept the respective second front wheel member for longitudinal rolling movement of said respective second front wheel member from said second track entry position relative to which the respective second front well is disposed longitudinally frontwardly to said base area of the respective second front well, and to thereat permit the second front anchor member of said respective second front well to enter said releasable, securing engagement with a respective one of the second front connecting means, thereby to releasably, securingly anchor the second seat assembly to the vehicle; and each of said second rear tracks being associated with a respective one of the second rear wheel members and extending within the respective second rear well longitudinally frontwardly and downwardly from the second rear entry position relative to which the respective second rear well is disposed longitudinally frontwardly, to a base area, vertically positioned below the floor surface, of the respective second rear well, each second rear track being adapted to guidingly accept the respective second rear wheel member for longitudinal rolling movement of said respective second rear wheel member from said second rear entry position relative to which the respective second rear well is disposed longitudinally frontwardly to said base area of the respective second rear well, and to thereat permit the second rear anchor member of said respective second rear well to enter releasable, securing engagement with a respective one of the second rear connecting means, thereby to releasably, securingly anchor the second seat assembly to the vehicle.

18. A vehicle seat system according to claim 17, wherein each second front track extending within the respective second front well longitudinally frontwardly and downwardly from said second track entry position relative to which the respective second front well is disposed longitudinally frontwardly has a second front track extension extending longitudinally, rearwardly atop the floor surface from said second track entry position relative to which the respective second front well is disposed longitudinally frontwardly toward said rear opening of the vehicle.

19. A vehicle seat system according to claim 18, wherein the second front track extensions respectively extend longitudinally rearwardly to the second rear wells.

20. A vehicle seat system according to claim 19, wherein each second rear track extending within the respective second rear well longitudinally frontwardly and downwardly from the second rear entry position relative to which the respective second rear well is disposed longitudinally frontwardly has a second rear track extension extending longitudinally rearwardly atop the floor surface from said second rear entry position relative to which the respective second rear well is disposed longitudinally frontwardly toward said rear opening of the vehicle, and wherein the second front wheel members and the second rear wheel members are further adapted to permit said longitudinal rolling movement of the second seat assembly when the second seat assembly is operatively positioned with the second front wheel members upon the second front track extensions and with the second rear wheel members upon the second rear track extensions.

21. A vehicle seat system according to claim 20, further comprising a second pair of front well liners, comprising two second front well liners, and a second pair of rear well liners, comprising two second rear well liners.

22. A vehicle seat system according to claim 21, wherein the second front wheel members each have a second front wheel diameter, the second rear wheel members each have a second rear wheel diameter, wherein the second front wheel diameter is larger than the second rear wheel diameter, and wherein the second front wheel members and the second rear wheel members are constructed from a resiliently compressible rubberized material.

23. A vehicle seat system according to claim 22, wherein the second front track extensions are longitudinally displaced from the second rear tracks extensions a distance that is less than the second front wheel diameter, but greater than the second rear wheel diameter, so as to permit the second front wheel members to roll over the second rear wells upon said longitudinal rolling movement of the second seat assembly.

24. A vehicle seat system according to claim 23, wherein the second front wheel members and the second rear wheel members are mounted on an inboard side of each second rigid support structure and wherein the second front tracks, the second front track extensions, the second rear tracks, the second rear track extensions, the second front wheel members, the second rear wheel members, the second front wells, and the second rear wells are, respectively, mounted and positioned in parallel, longitudinal alignment, laterally displaced from the front wells, the rear wells, the front tracks, the rear tracks, the front track extensions, the rear track extensions, the front wheel members, and the rear wheel members.

* * * * *